United States Patent
Kuang et al.

(10) Patent No.: US 6,978,854 B1
(45) Date of Patent: Dec. 27, 2005

(54) HYBRID ELECTRIC VEHICLE POWERTRAIN WITH AN ALTERNATE OPERATING MODE WITHOUT A HIGH VOLTAGE SYSTEM

(75) Inventors: Ming Kuang, Canton, MI (US); Tony Lockwood, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 10/710,674

(22) Filed: Jul. 28, 2004

(51) Int. Cl.[7] ............................................. B60K 6/00
(52) U.S. Cl. .................... 180/65.2; 180/65.3; 477/5
(58) Field of Search ................. 180/65.1, 65.2, 180/65.3, 65.4, 65.8, 65.7, 285, 278, 277; 477/5, 6, 87, 86, 176; 290/40 B, 40 C, 40 F

(56) References Cited

U.S. PATENT DOCUMENTS

| | | | |
|---|---|---|---|
| 5,343,970 A | 9/1994 | Severinsky | |
| 6,003,626 A | 12/1999 | Ibaraki et al. | |
| 6,098,733 A | 8/2000 | Ibaraki et al. | |
| 6,254,507 B1 * | 7/2001 | Downs | 477/4 |
| 6,290,043 B1 | 9/2001 | Ginder et al. | |
| 6,376,927 B1 * | 4/2002 | Tamai et al. | 290/40 C |
| 6,394,244 B1 | 5/2002 | Dwivedi et al. | |
| 6,490,511 B1 * | 12/2002 | Raftari et al. | 180/65.1 |
| 6,554,088 B2 * | 4/2003 | Severinsky et al. | 180/65.2 |
| 6,740,002 B1 * | 5/2004 | Stridsberg | 475/5 |
| 6,746,366 B2 * | 6/2004 | Tamor | 477/5 |
| 6,793,034 B2 * | 9/2004 | Raftari et al. | 180/65.2 |

* cited by examiner

*Primary Examiner*—Hau Phan
(74) *Attorney, Agent, or Firm*—Brooks Kushamn P.C.; Carlos Hanze

(57) ABSTRACT

A hybrid electric powertrain and control method for an automotive vehicle having mechanical and electro-mechanical power flow paths from an engine to a power output member. A mechanical power flow path is maintained when the electro-mechanical power flow path is disabled.

11 Claims, 4 Drawing Sheets

HYBRID ELECTRIC VEHICLE POWERTRAIN WITH AN ALTERNATE OPERATING MODE WITHOUT A HIGH VOLTAGE SYSTEM

BACKGROUND OF INVENTION

1. Field of the Invention

The invention relates to a control system for controlling distribution of power from a battery and an engine in a powertrain for a hybrid electric vehicle.

2. Background Art

A powertrain for a hybrid electric vehicle has two sources of power. One source typically includes an internal combustion engine. The second source of power includes a high voltage electric motor, usually an induction motor. One class of hybrid electric vehicle powertrains has parallel power flow paths.

The first power source for a parallel hybrid electric powertrain configuration comprises a combination of an engine, a motor, a generator, a high voltage battery and a planetary gearset for coordinating power distribution. The second power source comprises a combination of an electric drive system with a motor, a generator and a high voltage battery. The high voltage battery acts as an energy storing device for the generator and the motor. A low voltage battery is used to power the vehicle accessories, a powertrain controller and engine spark.

Engine output power for the first power source can be divided into two power flow paths by controlling the generator speed. A mechanical first power flow path is established from the engine to the planetary gear gearset, and ultimately to a transmission power output shaft. A second power flow path is an electro-mechanical power flow path that distributes power from the engine to the generator to the motor, and hence to the power output shaft of the transmission. The generator in this instance can be used to distribute torque to the gearset. With this powertrain configuration, the generator, the motor and the gearset may operate as an electro-mechanical transmission with continuously variable ratio characteristics.

By braking the generator with a selectively actuated brake, engine output power can be transmitted with a fixed gear ratio to the power output shaft of the transmission.

The electric motor of the second power source, may draw power from the high voltage battery and provide driving torque independently of the engine during both forward and reverse drive modes. Further, the generator can draw power from the high voltage battery and drive the vehicle forward using a one-way reaction brake on an engine power output shaft. In this instance, when the generator drive mode is effective, the generator acts as a motor.

The powertrain is under the control of a vehicle powertrain control module or controller, which coordinates the two sources of power to optimize total powertrain efficiency and performance while satisfying the driver's demand for power. The vehicle control system determines when and what each functioning component and subsystem should be used to satisfy the driver's demand for power. The function of the battery-motor-generator subsystem is lost, however, if the battery experiences an open circuit condition while the vehicle is in motion. The divided power delivery hybrid vehicle powertrain then cannot operate and the vehicle system controller will command the vehicle to shut down. This is due to the fact that the controller then cannot control distribution of current between the motor and the generator because the high voltage battery, which no longer is in the circuit, cannot perform its usual function as a capacitor to regulate bus voltage between the motor and the generator. The electrical connection between the generator and the motor then would be characterized by unstable, non-linear, voltage spikes.

Vehicle shut down under this abnormal powertrain condition is a result of the inability of the system to transmit power from the engine to the vehicle traction wheels through a mechanical power flow path, which requires either generator control or application of the generator brake. The generator cannot be controlled under this abnormal condition, however, because the high voltage battery is not in the circuit. Thus, the only way that power can be transmitted from the engine to the vehicle traction wheels through a mechanical torque flow path is to apply the generator brake. This results in a fixed gear ratio between the engine speed and the vehicle speed, as explained above, but it will cause the engine to stall when the engine speed falls below idle speed.

SUMMARY OF INVENTION

The invention makes it possible to integrate two power sources in a powertrain of the kind discussed above so that they work together seamlessly during operation under normal conditions with a common gear system while avoiding control problems and engine stalling during operation under abnormal conditions when the battery-motor-generator subsystem is not functioning. The invention will accomplish this while optimizing total powertrain efficiency and performance during operation under normal conditions as it coordinates the control of power from the two power sources.

A powertrain controller performs the coordination function in a divided power flow powertrain configuration. Under normal operating conditions, the powertrain controller interprets the driver's demand for power as a function of acceleration or deceleration. It then determines how much power each power source needs to provide to the transmission to meet the driver's power demand and to achieve specified vehicle performance (i.e., engine fuel economy, emission quality, driveabilty, etc.). The powertrain controller determines the optimum operating point of the engine torque and speed relationship.

The generator, as previously explained, can be braked to establish a parallel mechanical torque flow path to the traction wheels with a fixed gear system ratio.

Features of the invention are common to a hybrid vehicle powertrain disclosed in co-pending U.S. patent application Ser. No. 10/248,886, filed Feb. 27, 2003, which is owned by the assignee of this invention. The disclosure of that co-pending application is incorporated herein by reference.

The present invention overcomes the shortcomings described in the preceding discussion by allowing the power-train to satisfy the driver's power demand as much as possible if the high voltage battery is eliminated from the battery-motor-generator subsystem. It can function to effect power delivery to the traction wheels even though the high voltage battery is effectively disconnected from the rest of the powertrain. In this way problems caused by lack of control of current between the motor and the generator do not occur.

The invention includes, furthermore, a solution to the problem of stalling the engine when the vehicle speed decreases below a threshold value, such as idle speed, when the function of the high voltage subsystem is lost and the generator brake is applied. If the vehicle is stopped and the driver advances the accelerator to accelerate the vehicle to a certain vehicle speed, an accelerator signal commands torque at the wheels as the powertrain controller commands activation of a variable speed clutch between the planetary gear set and the engine. When the variable speed clutch is activated, slipping in the clutch will allow for a small amount of reaction torque that will cause a torque output element of the gearset to rotate. This allows a low vehicle speed while the engine is above its stall speed.

As the vehicle speed thereafter increases, the amount of the reaction torque is increased because of the increasing clutch friction characteristic of the variable speed clutch. This continues until the vehicle traction wheel speed equals the engine speed corresponding to the transmission ratio. At this point, the variable clutch is fully engaged and maximum reaction torque exists. Engine speed then can be increased to increase vehicle speed based on driver demand.

A low voltage battery normally is used to power the controller, the engine spark and the vehicle accessories. If the high voltage battery is ineffective as a source of power, there will be a loss of low voltage battery charging. Under normal conditions, the high voltage of the high voltage battery is converted to low voltage by a DC/DC converter to effect charging of the low voltage battery.

A loss of the high voltage system under abnormal conditions, as explained above, will prevent low voltage battery charging. Any continued use of the vehicle for an extended time, therefore, will cause the low voltage battery to drain. If low voltage battery power is reduced substantially, the vehicle may stall. An alternator then may be used under these conditions with a selectively engageable alternator clutch to connect the alternator to the engine. This permits the driver to operate the vehicle after a loss of high voltage subsystem power.

DETAILED DESCRIPTION

In the description of the invention, reference will be made to "negative" and "positive" battery power requests. Assuming that the battery power request is for charging, that request refers to negative power. If the battery power request is for discharging, that request refers to positive power.

Figure 1:
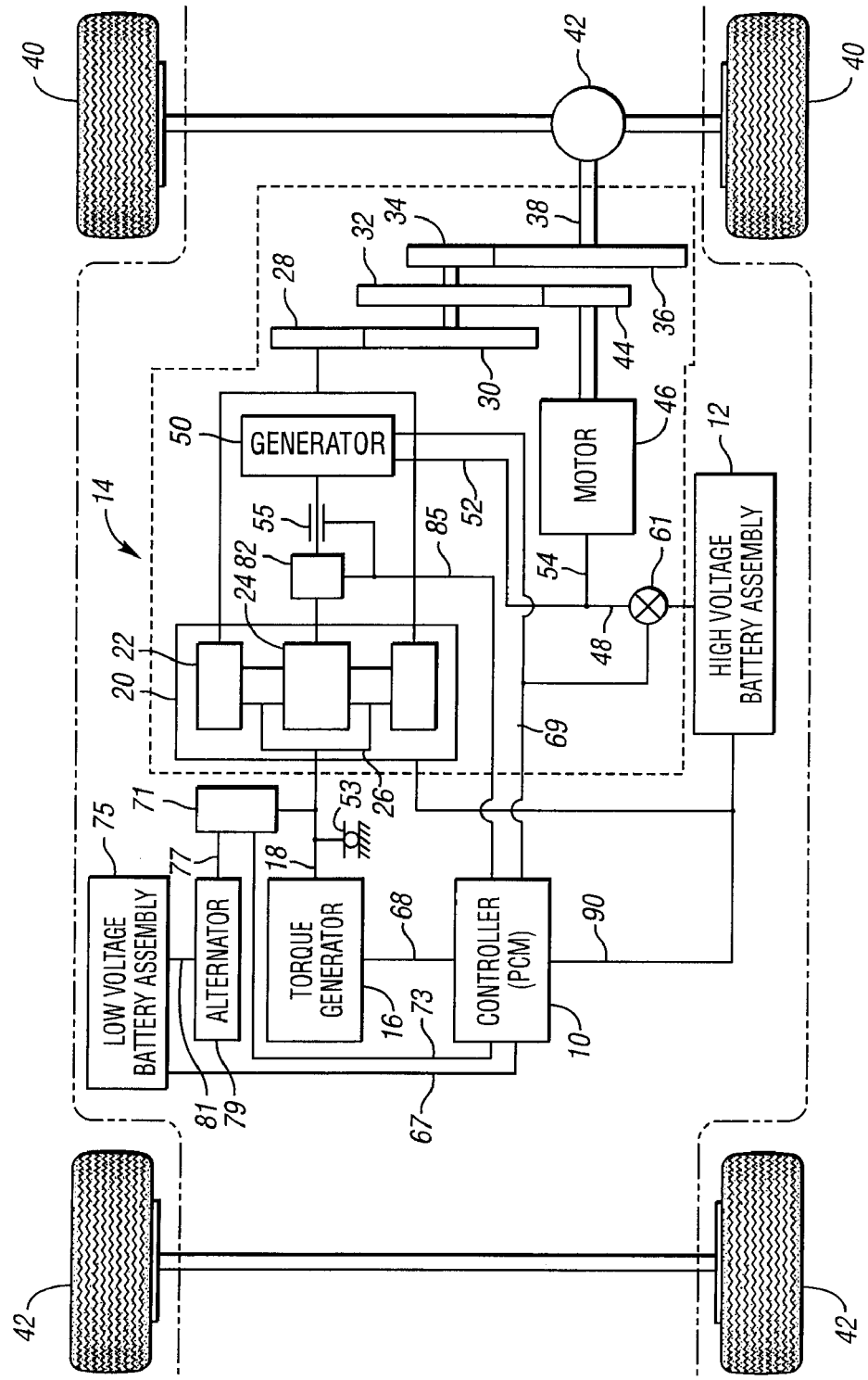
FIG. 1 is a schematic representation of a power divided powertrain configuration embodying the invention.

The hybrid electric vehicle powertrain of the disclosed embodiment of the invention has a parallel-series configuration, as shown in FIG. 1. It includes a vehicle powertrain control module or controller 10, a high voltage battery 12 and a transmission 14, together with a motor-generator subsystem. An engine 16 (torque generator), controlled by controller 10, distributes torque through torque input shaft 18 to transmission 14.

The transmission 14 includes, but is not limited to, a planetary gear unit 20, which comprises a ring gear 22, a sun gear 24, and a planetary carrier assembly 26. Ring gear 22 distributes torque to step ratio gears comprising meshing gear elements 28, 30, 32, 34 and 36. A torque output shaft 38 for the transmission is drivably connected to vehicle traction wheels 40 through a differential-and-axle mechanism 42. Front dirigible vehicle wheels are shown at 42.

Gears 30, 32 and 34 are mounted on a countershaft, the gear 32 engaging a motor-driven gear 44. Electric motor 46 drives gear 44, which acts as a torque input for the countershaft gearing.

High voltage battery 12 delivers electric power to the motor through power flow path 48. Generator 50 is connected electrically to the battery and to the motor in known fashion, as shown at 52.

When the high voltage powertrain battery 12 is acting as a sole power source with the engine off, the torque input shaft 18 and the carrier assembly 16 are braked by an overrunning coupling 53. A mechanical generator brake 55 anchors the rotor of generator 50 and the sun gear 24 when the engine is on and the powertrain is in a parallel drive mode, the sun gear 24 acting as a reaction element.

As mentioned previously, there are two power sources for the driveline. The first power source is a combination of the engine and the battery-motor-generator subsystem, which are connected together by the planetary gear unit 20. The other power source involves only the electric drive system including a combination of the motor, the generator and the high voltage battery, where the battery acts as an energy storage medium for the generator and the motor.

A switch 61, under the control of controller 10, selectively connects and disconnects the high voltage battery and motor 46. Signal flow path 69 connects the controller 10 with switch 61, with the motor 46 and with the generator 50. The controller 10 will sense that battery 12 is non-functional and will open switch 61 and shut down generator 50 and motor 46.

Generator brake 55 and a variable speed clutch assembly 82 are electrically coupled to controller 10 as shown at 85. The engine 16 is electrically coupled to controller 10 as shown at 68. Variable speed clutch assemblies are well known in the powertrain art.

An alternator 79 is mechanically coupled to engine 16 by clutch 71, as shown at 77. Clutch 71 is mechanically coupled to the engine, as shown at 18, and is electrically coupled to controller, 10 as shown at 73.

A low voltage battery 75 is electrically coupled to alternator 79, as shown at 81, and to controller 10, as shown at 67.

The controller 10 is electrically coupled to high voltage battery 12 and to gear unit 20, as shown at 90.

Variable speed clutch assembly 82 establishes a mechanical coupling between sun gear 24 and generator 50.

Figure 2:
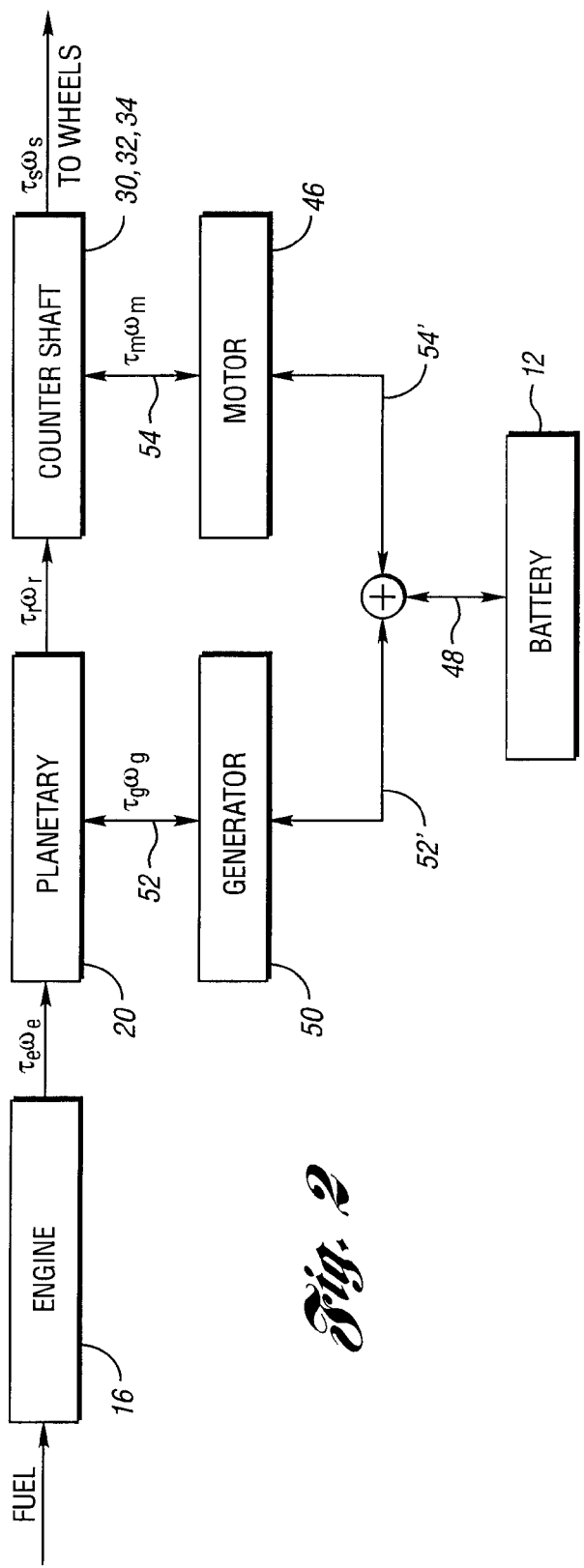
FIG. 2 is a schematic representation in block diagram form of powertrain power flow.

The power flow paths between the various elements of the power dividing powertrain shown in FIG. 1 are illustrated in FIG. 2. Fuel is delivered to the engine 16 under the control of the operator in known fashion using an engine throttle. Engine power delivered to the planetary gear unit 20 is expressed as $T_e \omega_e$, where $T_e$ is engine torque and $\omega_e$ is engine speed. Power delivered from the planetary ring gear to the countershaft gears is expressed as $T_r \omega_r$, which is the product of ring gear torque and ring gear speed. Power out from the transmission 14 is represented by the symbols $T_S$ and $\omega_S$, the torque of shaft 38 and the speed of shaft 38, respectively.

The generator, when it is acting as a motor, can deliver power to the planetary gearing. Alternatively, it can be driven by the planetary gearing, as represented in FIG. 2 by the torque flow path 52. Similarly, power distribution between the motor and the countershaft gears can be distributed in either direction, as shown by the torque flow path 54. Driving power from the battery or charging power to the battery is represented by the bi-directional arrow 48. Power flow between battery 12 and generator 50 is represented by bi-directional arrow 52'. Power flow between battery 12 and motor 46 is represented by bi-directional arrow 54'.

Figure 5:
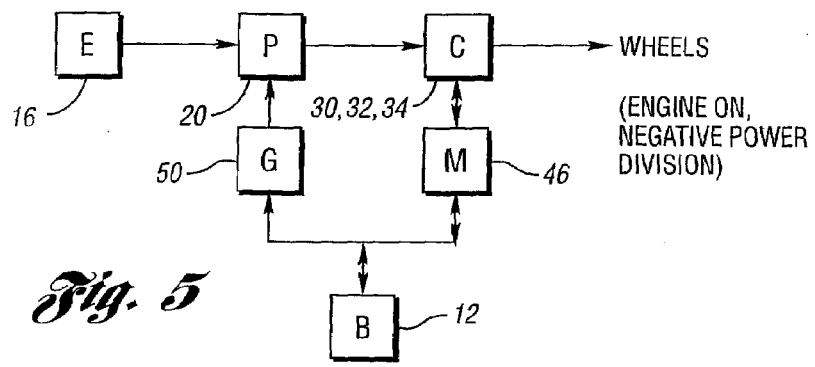
FIG. 5 is a block diagram similar to FIG. 3 wherein the engine is on and the power flow has a negative power division.

As shown in FIG. 2, engine output power can be divided into two paths by controlling the generator speed. The mechanical power flow path, $T_r\omega_r$, is from the engine to the carrier to the ring gear to the countershaft. The electrical power flow path is from the engine to the generator to the motor to the countershaft. The engine power thus is divided so that the engine speed is disassociated from the vehicle speed during a so-called positive split mode of operation. This condition is illustrated in FIG. 5, where the engine 16 delivers power to the planetary gearing 20, which delivers power to the countershaft gears 30, 32 and 34. These gears in turn drive the traction wheels 40. A portion of the planetary gearing power is distributed to the generator 50, which delivers charging power to the high voltage battery 12. The speed of the generator then is greater than zero or positive, and the generator torque is less than zero. The battery drives the motor 46, which distributes power to the countershaft. This arrangement is a positive power division.

If the generator, due to the mechanical properties of the planetary gear unit, acts as a power input to the planetary gear unit to drive the vehicle, the operating mode can be referred to as a negative power division. This condition is shown in FIG. 5, where the generator speed is negative and the generator torque also is negative.

The generator in FIG. 5 delivers power to the planetary gear unit 20 as the motor 46 acts as a generator and the high voltage battery 12 is charging. It is possible, however, that under some conditions the motor may distribute power to the countershaft gearing if the resulting torque at the traction wheels 40 from the gearing does not satisfy the driver demand. Then the motor must make up the difference.

Figure 6:
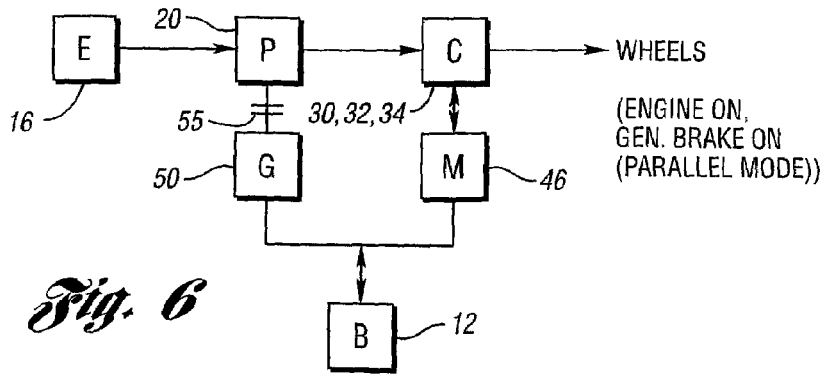
FIG. 6 is a block diagram similar to FIG. 3 wherein the engine is on and the generator brake is on, thereby establishing a parallel power flow mode.

If the generator brake 55 is activated, a parallel operating mode is established. This is shown in FIG. 6, where the engine 16 is on and the generator is braked. The high voltage battery 12 powers the motor 46, which powers the countershaft gearing simultaneously with delivery of power from the engine to the planetary gearing and then to the countershaft gearing.

The first power source, as previously described, can deliver torque only for forward propulsion because there is no reverse gear in the countershaft gearing. The engine requires either generator control or a generator brake to permit transfer of power to the wheels for forward motion.

Figure 3:
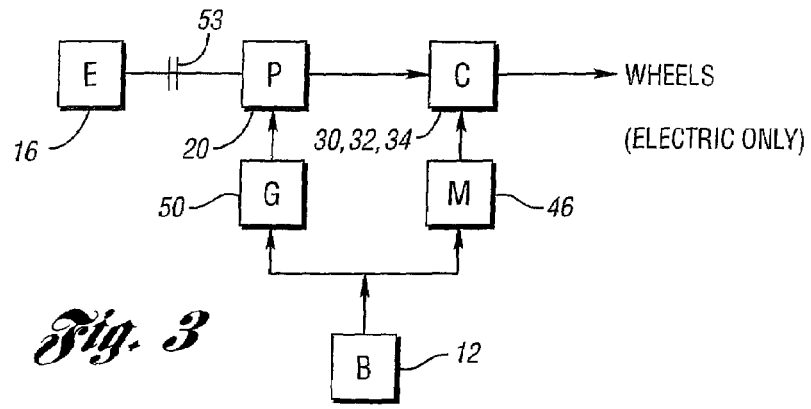
FIG. 3 is a schematic block diagram representation of a hybrid electric vehicle powertrain with only the motor and a generator, together with a battery, acting as a power source.
Figure 4:
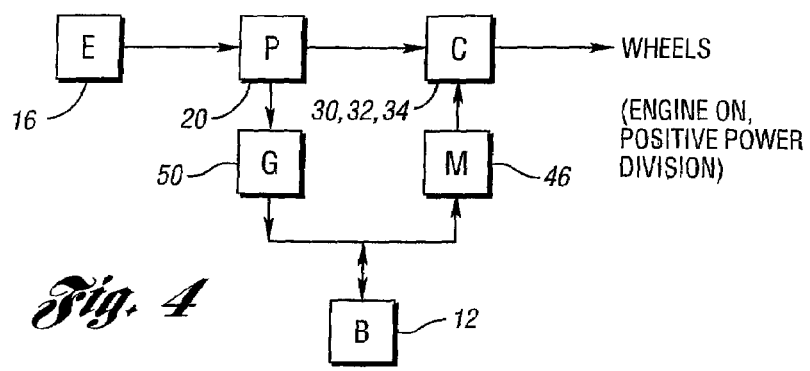
FIG. 4 is a block diagram similar to FIG. 3 wherein the engine is operating with a positive power division.

The second source of power, as previously described, is the high voltage battery-motor-generator subsystem. This is illustrated in FIG. 3. In this driving mode, the engine is braked by the overrunning coupling 53. The electric motor draws power from the high voltage battery and effects propulsion independently of the engine, with either forward or reverse motion. The generator may draw power from the high voltage battery and drive against the reaction of one-way coupling 53. The generator in this operating mode operates as a motor.

As previously indicated, the two power sources are integrated so that they seamlessly work together to meet the driver's demand for power while maintaining optimum powertrain efficiency and performance. The system will determine the driver's demand for torque and achieve the optimum division of power between the two power sources.

Although a powertrain with divided power flow paths is illustrated in FIG. 1, the invention is capable of being used also in other powertrain configurations with an engine, a motor, a generator and a battery system.

The transmission 14, in one embodiment, includes the generator brake assembly 55, as previously described, a variable speed slipping clutch assembly 82, and a clutch 71. The clutch 71 is coupled mechanically to an alternator 79, as shown at 77. It is coupled electrically to the controller 10, as shown at 73, and is coupled mechanically to the output shaft 18 of the engine (torque generator) 16.

The controller 10, upon sensing a loss of power from the high voltage battery 12, engages clutch 71 by the use of commands placed on bus 73, thereby allowing the engine 12 to charge low voltage battery assembly 75 through the alternator 79. This allows the vehicle 10 to be continually operated.

The variable speed clutch assembly 82 is coupled to the sun gear 24 of the planetary gear assembly 20. The generator brake 55 acts on a mechanical coupling between the generator 50 and the variable speed clutch assembly 82. Both the generator brake 55 and the variable clutch assembly 82 are coupled to the controller 10 by bus 85.

The variable speed clutch assembly 82, for example, may be a slipping wet friction clutch, a clutch with a fluid medium comprising suspended metallic particles or an MR fluid clutch, all of which are well known in the art. A MR fluid clutch (magneto rheological clutch) uses a clutch fluid medium that can transfer torque between clutch input and output members when a controlled magnetic flux field is applied to the medium. The torque capacity of the clutch is functionally related to applied voltage. Examples of variable speed clutches are described in U.S. Pat. Nos. 6,290,043 and 6,394,244, which are owned by the assignee of this invention. The disclosures of these patents are incorporated herein by reference.

Figure 7:
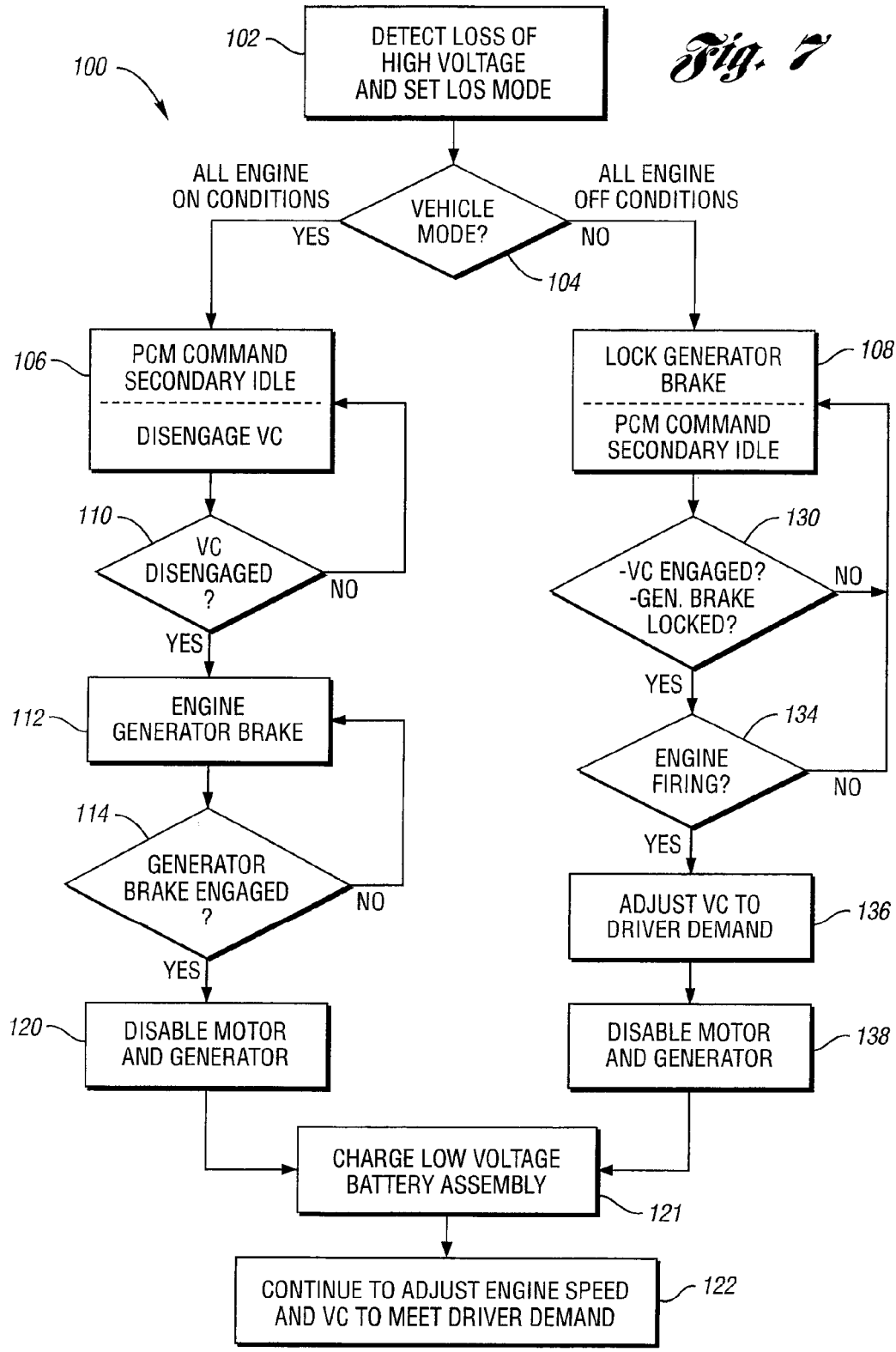
FIG. 7 is a flow chart that illustrates a sequence of operational steps in the strategy of an embodiment of the invention.

The controller 10 in the disclosed embodiment of the invention includes software and other logic that allow the invention to perform the method of the preferred embodiment of the invention, which is set forth in greater detail in FIG. 7. The controller 10 is also coupled to high voltage battery 12 and to control elements in the planetary gear assembly 20 by bus 90. The controller 10 may comprise a number of interconnected controller assemblies rather than a single controller. The description of the embodiment of FIG. 1 is not meant to limit the architecture of the controller to a single controller or to any number of controllers.

In an alternate embodiment of the invention, transmission 14 may comprise only the controller 10 and the variable clutch assembly 82 and may be retrofitted within an existing vehicle having a generator brake. Moreover, during typical operation the variable clutch 82 can be engaged, thereby allowing transfer of torque between the sun gear 24 and the generator 50. Further, the brake 55 can be selectively engaged in normal operation to provide reactive torque for the internal combustion engine 12, thereby allowing power to flow to the wheels 32, 34.

FIG. 7 shows a strategy flowchart 100, which comprises the method of the disclosed embodiment of the invention. It includes a first step 102 in which the controller 10 detects a loss of voltage within the battery assembly 12 or detects interruption of the transfer of electrical energy from the high voltage battery assembly 12 to the bus 52. Upon such interruption, the controller 10 enters a LOS (limited operating strategy) mode of operation.

Step 104 follows step 102. In step 104, the controller 10 determines, by the use of bus 68, whether the internal combustion engine 12 is operating. If the internal combustion engine 12 is operating, step 104 is followed by step 106. Alternatively, step 104 is followed by step 108.

In step 106, the controller 10 places the internal combustion engine 12 in an idle state and disengages variable speed clutch assembly 82 by sending control signals to the assembly 82 by use of the bus 85.

Step 110 follows step 106. In step 110, the controller 10 determines whether the variable clutch 82 has been engaged. If the variable clutch 82 has not been engaged, step 110 is followed by step 106. Alternatively, step 110 is followed by step 112 in which the controller 10 engages or activates the generator brake assembly 55 by generating and communicating control signals to the assembly 55 by use of the bus 85.

In step 114, which follows step 112, controller 10 ascertains whether the generator brake assembly 55 has engaged. If the generator brake assembly 55 has engaged, step 114 is followed by step 120. Alternatively, step 114 is followed by step 112.

In step 120, the controller 10 disables or deactivates the motor 46 and the generator 50 by the use of signals placed on buses 69 and 52. Step 121 follows step 120. In this step 121, controller 10 engages the clutch 71 by the use of signals placed on bus 73, thereby allowing electrical charge to be delivered from an alternator 79 to the low voltage battery assembly 75 by the use of bus 81. In an alternative embodiment, the clutch 71 may be omitted. In still another embodiment, an electrical insulation member (e.g. a relay) may be placed between the alternator 79 and the low voltage battery assembly 75. The relay may be selectively opened by the controller 10, thereby isolating the low voltage battery assembly 75 from the alternator 79 in normal or typical operation.

Step 122 follows step 121. In this step 122, the controller 10 continues to adjust the variable clutch assembly 82 in order to meet the torque demand of the driver and to prevent the vehicle from stalling.

The variable clutch assembly 82 is fully engaged when the required speed of the vehicle, as determined by the controller 10 using the position of the accelerator member (not shown) and the wheel brakes (not shown), is greater than the corresponding speed at which the internal combustion engine 12 will stall. Should the vehicle be operated at a speed that is equal to or less than the corresponding speed at which the internal combustion engine 16 will stall (e.g., the stall speed), the controller 10 partially disengages the variable clutch assembly 82 in order to allow the internal combustion engine 12 to operate at a speed that is greater than its stall speed and at a speed greater than that required to maintain a desired vehicle speed. Particularly, the extra speed (e.g., the difference between the speed of the crankshaft 18 and the corresponding vehicle speed) is absorbed by slippage of the variable clutch 82. The amount of such slippage of the variable clutch 82 is directly proportional to the difference between the engine speed and the corresponding vehicle speed, thereby variably coupling the internal combustion engine 12 to the output shaft 38 and varying the ratio of the speed of the engine 12 to the speed of the vehicle (e.g., the speed of output shaft 38 to the speed of the vehicle).

In step 108, the controller 66 activates or energizes the generator brake 55 and causes the internal combustion engine 16 to enter an idle state. Step 130 follows step 108. In this step 130, the controller 66 determines whether the generator brake 55 and the variable clutch assembly 82 are locked or activated. If these assemblies 55, 82 are not locked or activated, then step 130 is followed by step 108. Alternatively, step 130 is followed by step 134 in which the controller 10 determines whether the internal combustion engine 12 is activated. If the internal combustion engine 12 is not activated, step 134 is followed by step 108. Alternatively, step 134 is followed by step 136 in which the controller 66 causes the variable speed clutch assembly 82 to meet the vehicle speed demanded or required by the driver of the vehicle.

Step 138 follows step 136 in which the controller 10 disables the motor 46 and the generator 50. Step 138 is followed by step 121 and step 122 follows step 121. Steps 121 and 122 are described above.

Although an embodiment of the invention has been disclosed, it will be apparent to persons skilled in the art that modifications may be made without departing from the scope of the invention. All such modifications and equivalents thereof are included in the scope of the following claims.

What is claimed is:

1. A hybrid electric powertrain for an automotive vehicle comprising:
   an engine, an electric motor, a battery, a generator and transmission gearing;
   the transmission gearing defining in part a first power flow path from the engine to a power output member;
   the generator being mechanically coupled to the engine by the transmission gearing;
   the motor, the battery and the generator being electrically coupled and defining in part an electro-mechanical power flow path to the power output member;
   a generator torque reaction brake means for anchoring the generator when the electro-mechanical power flow path is disabled; and
   a slipping clutch mechanically connecting a torque reaction element of the gearing to the generator whereby a mechanical power flow path from the engine to the power output member is maintained when the electro-mechanical power flow path is disabled.

2. The hybrid electric powertrain set forth in claim 1 wherein the battery is a high voltage battery;
   the battery, the generator and the motor forming an electrical power delivery sub-system for satisfying a power demand; and
   a vehicle controller including means for controlling electrical current transfer between the motor and the generator as the battery functions as an electrical energy storage medium;
   the electro-mechanical power flow path being disabled when the battery is in an open circuit state.

3. The hybrid electric powertrain set forth in claim 2 wherein the vehicle controller includes means for disabling the generator and the motor when the battery is in an open circuit state.

4. The hybrid electric powertrain set forth in claim 2 wherein the transmission gearing includes a planetary gearset having a ring gear element, a sun gear element and a carrier element with planet pinions engaged with the sun ear element and the ring gear element;
   the generator being mechanically coupled to one element of the gearset and the engine being mechanically coupled to a second element of the gearset, a third element of the gearset being mechanically coupled to the power output member;

the slipping clutch defining in part a mechanical connection between the generator and the one element of the gearset.

5. The hybrid electric powertrain set forth in claim 1 wherein the transmission gearing includes a planetary gearset having a ring gear element, a sun gear element and a carrier element with planet pinions engaged with the sun gear element and the ring gear element;

the generator being mechanically coupled to one element of the gearset and the engine being mechanically coupled to a second element of the gearset, a third element of the gearset being mechanically coupled to the power output member;

the slipping clutch defining in part a mechanical connection between the generator and the one element of the gearset.

6. A hybrid electric powertrain for an automotive vehicle comprising:

an engine, an electric motor, a battery, a generator and transmission gearing;

the transmission gearing defining in part a first power flow path from the engine to a power output member;

the generator being mechanically coupled to the engine by the transmission gearing;

the motor, the battery and the generator being electrically coupled and defining in part an electro-mechanical power flow path to the power output member;

means for controlling generator speed by regulating current transfer between the motor and the generator as the battery functions as an electrical storage medium;

a generator torque reaction brake means for anchoring the generator to effect a mechanical power flow path from the engine to the power output member when the electro-mechanical power flow path to the power output member is disabled; and a slipping clutch in a mechanical connection between the engine and the generator whereby a mechanical power flow path is established between the engine and the power output member, reaction torque for the gearing being developed by the slipping clutch.

7. A hybrid electric powertrain for an automotive vehicle comprising:

an engine, an electric motor, a high voltage battery, a generator and transmission gearing;

the transmission gearing defining in part a first power flow path from the engine to a power output member;

the generator being mechanically coupled to the engine by the transmission gearing;

the motor, the high voltage battery and the generator being electrically coupled and defining in part an electro-mechanical power flow path to the power output member;

a generator torque reaction brake means for anchoring the generator when the electro-mechanical power flow path is disabled;

a slipping clutch mechanically connecting a torque reaction element of the gearing to the generator whereby a mechanical power flow path from the engine to the power output member is maintained when the electro-mechanical power flow path is disabled;

a low voltage battery and alternator forming a low voltage power source for the vehicle; and an alternator drive clutch means for connecting the alternator to the engine as the slipping clutch is activated.

8. The hybrid electric powertrain set forth in claim 7 wherein the high voltage battery, the generator and the motor form an electrical power delivery sub-system for satisfying a power demand; and a vehicle controller including means for controlling electrical current transfer between the motor and the generator as the high voltage battery functions as an electrical energy storage medium;

the electro-mechanical power flow path being disabled when the high voltage battery is in an open circuit state as low voltage needs are supplied by the low voltage battery.

9. A method for controlling a hybrid electric powertrain for an automotive vehicle, the powertrain having an engine, an electric motor, a high voltage battery, a generator and transmission gearing defining in part a mechanical power flow path from the engine to a power output member, the motor, the high voltage battery and the generator being electrically coupled and defining in part an electro-mechanical power flow path to the power output member, the method comprising the steps of:

establishing a driving connection between the generator and the engine;

braking the generator to provide reaction torque for a reaction element of the gearing as a mechanical power flow path is established between the engine and the power output member; and establishing a variable speed connection between the reaction element of the gearing and the generator when the generator is braked, whereby the engine is allowed to operate at speeds above a stall speed when the mechanical power flow path is established.

10. The method set forth in claim 9 wherein the step of braking the generator occurs in response to disablement of the electro-mechanical power flow path.

11. The method set forth in claim 9 including the step of establishing a low voltage source for the vehicle; and activating the low voltage source when the generator is braked as a mechanical power flow path is established from the engine to the power output member.

\* \* \* \* \*